US008176455B2

(12) United States Patent
Tanaka

(10) Patent No.: US 8,176,455 B2
(45) Date of Patent: May 8, 2012

(54) SEMICONDUCTOR DEVICE DESIGN SUPPORT APPARATUS AND SUBSTRATE NETLIST GENERATION METHOD

(75) Inventor: Mikiko Tanaka, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 313 days.

(21) Appl. No.: 12/585,115

(22) Filed: Sep. 3, 2009

(65) Prior Publication Data

US 2010/0064267 A1    Mar. 11, 2010

(30) Foreign Application Priority Data

Sep. 5, 2008   (JP) ................................ 2008-228630

(51) Int. Cl.
*G06F 17/50* (2006.01)
*G06F 9/455* (2006.01)

(52) U.S. Cl. ........ 716/110; 716/105; 716/115; 716/122; 716/124; 716/131; 716/132; 716/136; 703/13; 703/14

(58) Field of Classification Search ................... 716/105, 716/110, 115, 122, 124, 131, 132, 136; 703/13, 703/14
See application file for complete search history.

(56) References Cited

U.S. PATENT DOCUMENTS

| | | | |
|---|---|---|---|
| 6,480,986 B1 * | 11/2002 | Richer | 716/115 |
| 6,725,185 B2 * | 4/2004 | Clement | 703/14 |
| 6,920,417 B2 * | 7/2005 | Lescot et al. | 703/13 |
| 6,941,258 B2 * | 9/2005 | Van Heijningen et al. | 703/16 |
| 7,246,335 B2 | 7/2007 | Murgai et al. | |
| 7,856,219 B2 * | 12/2010 | Dupuis | 455/280 |
| 7,908,578 B2 * | 3/2011 | Becker et al. | 716/122 |
| 2005/0005254 A1 * | 1/2005 | Hirano et al. | 716/5 |
| 2005/0074898 A1 * | 4/2005 | Datwani et al. | 436/180 |
| 2008/0151590 A1 * | 6/2008 | Rogers et al. | 365/52 |
| 2010/0085679 A1 * | 4/2010 | Makhratchev et al. | 361/234 |

FOREIGN PATENT DOCUMENTS

| | | |
|---|---|---|
| JP | 9-128433 | 5/1997 |
| JP | 2002-158284 | 5/2002 |
| JP | 2006-236340 | 9/2006 |

OTHER PUBLICATIONS

Marc van Heijningen et al., "High-Level Simulation of Substrate Noise Generation Including Power Supply Noise Coupling", 2000 DAC, 6 pgs.

* cited by examiner

*Primary Examiner* — Helen Rossoshek
(74) *Attorney, Agent, or Firm* — McGinn IP Law Group, PLLC

(57) ABSTRACT

A semiconductor device design support apparatus for generating a substrate netlist so as to be able to perform substrate noise analysis with high accuracy in a short time. The semiconductor device design support apparatus comprises a unit that divides a semiconductor device layout into a plurality of segments and generates a macro-model of the segments by using a current waveform of an instance included in the divided segments; a unit that replaces a pattern (termed as "substrate interface") that is designed to be an interface with a substrate with respect to the segments, by a prescribed substrate interface diagram; and a unit that generates a substrate netlist, based on the substrate interface diagram of the plurality of segments.

13 Claims, 17 Drawing Sheets

FIG. 15

Doping Profile Extract

| depth [um] | Concentration [cm⁻³] | |
|---|---|---|
| 0.00000000 | -0.16049532E+20 | |
| 0.00050000 | -0.16187584E+19 | |
| 0.00256410 | -0.17285332E+19 | |
| 0.00512821 | -0.18310862E+19 | |
| 0.00769231 | -0.18992869E+19 | |
| 0.01025641 | -0.19408634E+19 | |
| 0.01282051 | -0.19629075E+19 | 1.1 |
| 0.01538462 | -0.19703039E+19 | 1.2 |
| 0.01794872 | -0.19658456E+19 | 1.3 |
| 0.02051282 | -0.19509863E+19  × | 1.4 |
| 0.02307692 | -0.19265809E+19 | 1.7 |
| 0.02564103 | -0.18933629E+19 | 2.0 |
| 0.02820513 | -0.18521452E+19 | 3.0 |
| 0.03076923 | -0.18038526E+19 | |
| 0.03333334 | -0.17494915E+19 | |
| 0.03589744 | -0.16901084E+19 | |
| 0.03846154 | -0.16267551E+19 | |
| 0.04102564 | -0.15604628E+19 | |
| 0.04358974 | -0.14922207E+19 | |
| 0.04615385 | -0.14229575E+19 | |
| ⋮ | | |

SEMICONDUCTOR DEVICE DESIGN SUPPORT APPARATUS AND SUBSTRATE NETLIST GENERATION METHOD

REFERENCE TO RELATED APPLICATION

This application is based upon and claims the benefit of the priority of Japanese patent application No. 2008-228630 filed on Sep. 5, 2008, the disclosure of which is incorporated herein in its entirety by reference thereto.

TECHNICAL FIELD

The present invention relates to a semiconductor device design support apparatus and a substrate netlist generation method, and in particular, to a semiconductor device design support apparatus for facilitating analysis of substrate noise produced in a silicon substrate of a semiconductor device, and a substrate netlist generation method used in the analysis of the substrate noise.

BACKGROUND

Patent Document 1 discloses circuit elements for formulating a semiconductor integrated circuit by modeling a semiconductor substrate in terms of resistance element(s), inductance element(s), and capacitance element(s), and a technology for performing operation characteristic analysis using a circuit simulator. In Patent Document 1, when a configuration of a large number of very small substrate contacts is modeled and the number of nodes in the model becomes very large, modeling of a smaller substrate contact structure by modeling a local voltage drop produced by a current concentration in a vicinity of the substrate contacts using a hemispheric resistor is proposed from a viewpoint that simulation becomes very long.

Patent Document 2 discloses an analysis method for substrate noise characterized by having a step of applying a static timing analysis (STA) algorithm to a description of a digital circuit, and generating timing information related to 1 or more gates in the digital circuit; a step of applying a current waveform generation (CWG) algorithm to the description of the digital circuit, the timing information related to 1 or more gates in the digital circuit, and a description of a switching operation of the digital circuit to generate a current waveform; and a step of generating a reduced model (RM) for simulation of the digital circuit, according to a model of a package of the description of the digital circuit, the current waveform, and the digital circuit, and, by RM simulation of the digital circuit, generating an index of substrate noise related to the digital circuit.

Patent Document 3 discloses a method of determining a diffusion resistance calculation formula for an impurity diffusion layer when designing an LSI circuit.

In addition, Non-Patent Document 1 discloses a method of high accuracy simulation of substrate noise affecting performance of an analog circuit disposed inside the same substrate, by generating a macro-model with primitive instance units. Here, the term "(primitive) instance" indicates a name for uniquely identifying a cell indicating a logical unit in the substrate.

[Patent Document 1]
JP Patent Kokai Publication No. JP-P2002-158284A
[Patent Document 2]
JP Patent Kokai Publication No. JP-P2006-236340A
[Patent Document 3]
JP Patent Kokai Publication No. JP-A-9-128433

[Non-Patent Document 1]
Marc van Heijningen et al., "High-Level Simulation of Substrate Noise Generation Including Power Supply Noise Coupling", 2000 DAC, FIG. 1.

SUMMARY

The entire disclosures of Patent Document 1 to 3 and Non-Patent Document 1 are incorporated herein by reference thereto.

The following analysis is given by the present invention.

In comparison to the method of Patent Document 1 which performs mesh division, according to the method of Non-Patent Document 1 which generates the macro-model per primitive instance units, it is possible to simulate the substrate noise with high accuracy. On the other hand, in the method of Non-Patent Document 1, since the macro-model with primitive instance units is generated, there is a problem in that the macro-model and the substrate netlist become very large, and the analysis time becomes very long. A reason for this is as follows. That is, in ASIC (Application Specific Integrated Circuit) design and the like, the number of instances is extremely large and the netlist becomes excessively large when the macro-model and the substrate netlist are generated with a very large number of instance units.

According to a first aspect of the present invention, there is provided a semiconductor device design support apparatus that comprises: a unit that divides a semiconductor device layout into a plurality of segments and generates a macro-model of the segments using a current waveform of an instance included in the divided segments; a unit that replaces a pattern termed as "substrate interface", which is designed to be an interface with a substrate with respect to the segments, with a substrate interface diagram of a prescribed form; and a unit that generates a substrate netlist, based on the substrate interface diagram of the plurality of segments.

According to a second aspect of the present invention, there is provided a substrate netlist generation method comprising: dividing a semiconductor device layout into a plurality of segments and generating a macro-model of the segments, by using a current waveform of an instance included in the divided segments; replacing a pattern termed as "substrate interface", which is an interface with a substrate with respect to the segments, with a substrate interface diagram of a prescribed form; and generating a substrate netlist, based on the substrate interface diagram of the plurality of segments.

The meritorious effects of the present invention are summarized as follows.

According to the present invention, it is possible to prevent increasing the scale of the substrate netlist, while maintaining analysis accuracy, and to perform simulation in a short time. A reason for this is that a macro-model is formed of instances included in any one of the segments and the number of nodes is decreased, and also that it is possible to reduce the number of interface portions with the substrate.

BRIEF DESCRIPTIONS OF THE DRAWINGS

FIG. 15 is a drawing showing one example of a doping profile.

PREFERRED MODES

Outline of the Invention

A semiconductor device design support apparatus according to the present invention divides a semiconductor device layout into a plurality of segments, and uses a current waveform of an instance included in the divided segments, each substrate coupling direction, decoupling capacitance, and the like, to generate a macro-model in segment units, and also replaces a portion that is a substrate interface of the segments, with a substrate interface diagram that is simplified so as to reduce the number of nodes of a substrate netlist, and generates a substrate netlist (substrate resistance netlist).

Figure 1:
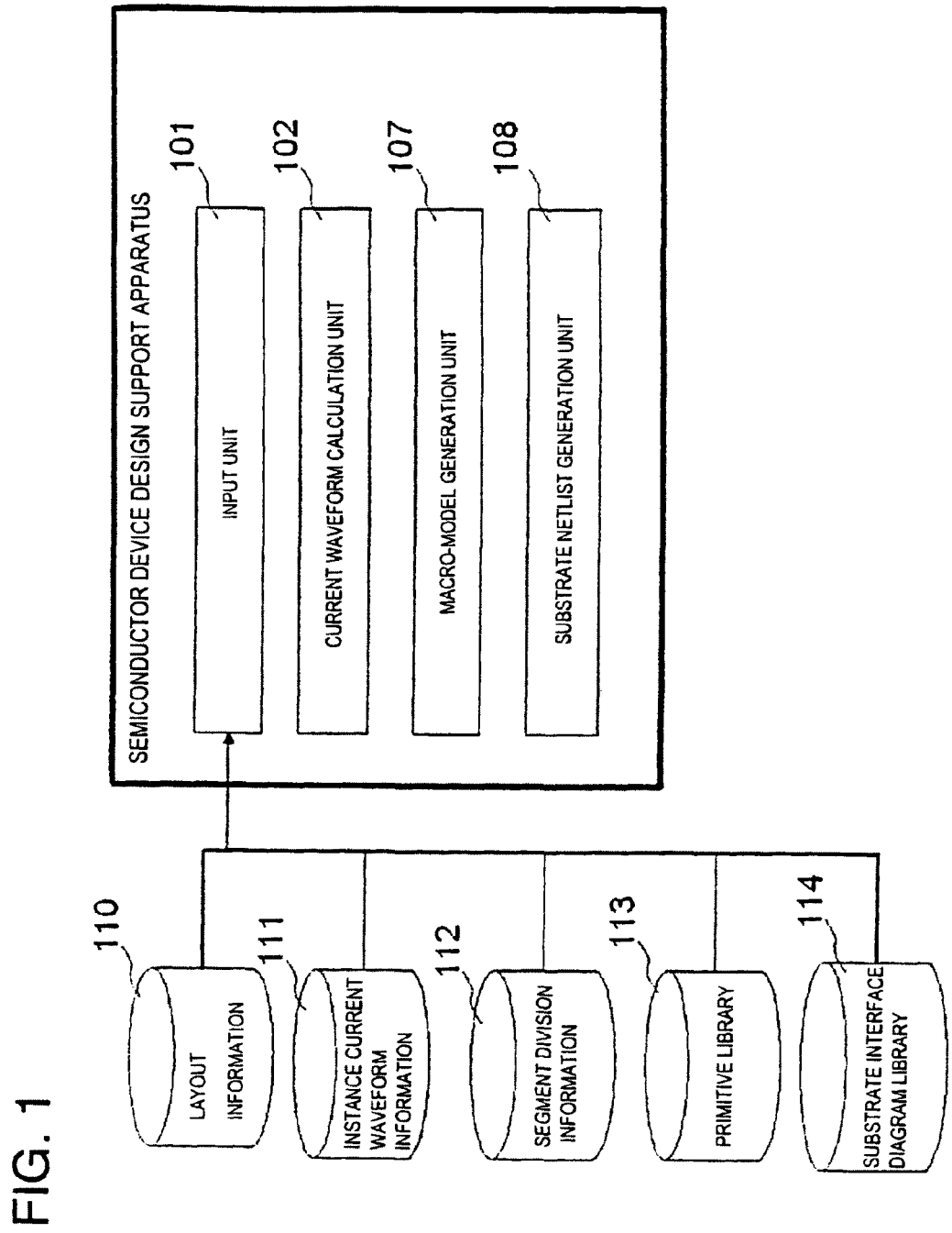
FIG. 1 is a drawing for describing an outline of the present invention.

More specifically, a current waveform calculation unit (102 in FIG. 1) of the semiconductor device design support apparatus obtains a current waveform (111 in FIG. 1: "instance current waveform information") of each instance inputted by an input unit (101 in FIG. 1), and a current waveform in segment units, based on segment division information (112 in FIG. 1).

Figure 7:
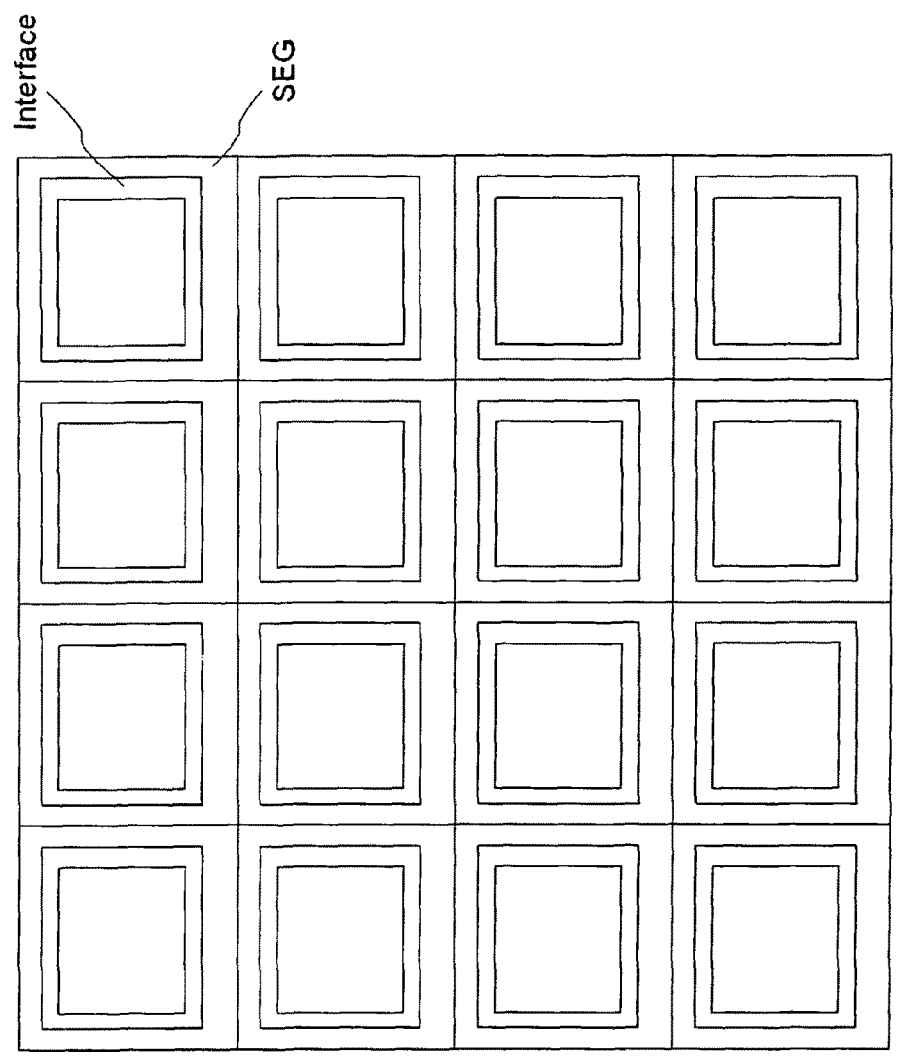
FIG. 7 is an example after replacing the substrate interface of FIG. 6 by the substrate interface diagram.
Figure 8:
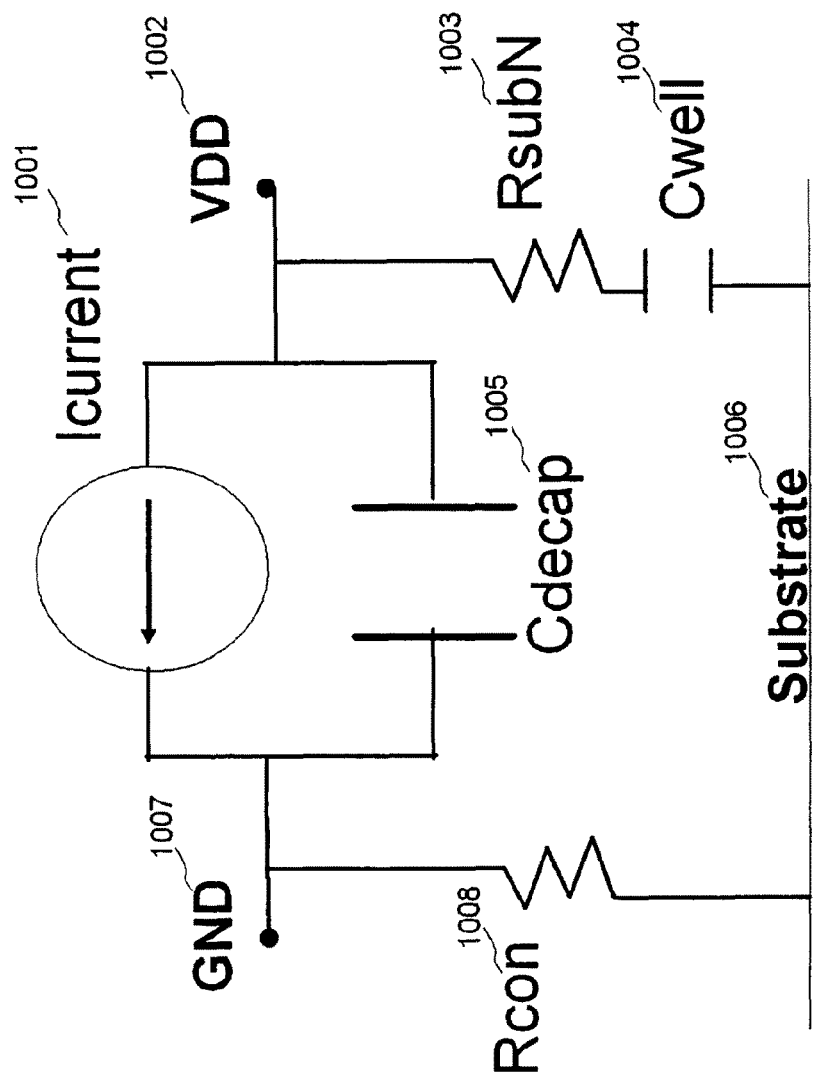
FIG. 8 is a drawing showing one example of a segment macro-model.

Next, a macro-model generation unit (107 in FIG. 1) generates a macro-model in segment units based on layout information (110 in FIG. 1) inputted by the input unit (101 in FIG. 1), segment division information (112 in FIG. 1), and a primitive library (113 in FIG. 1) (refer to FIG. 7 and FIG. 8). The macro-model generation unit (107 in FIG. 1) makes reference to the layout information (110 in FIG. 1) and the segment division information (112 in FIG. 1), and since an original substrate interface is degenerated, selects a substrate interface diagram from a substrate interface diagram library (114 in FIG. 1). The macro-model generation unit (107 in FIG. 1) corresponds to a unit that uses a current waveform of an instance or instances included in any one of the divided segments to generate a macro-model of a segment in question, and a unit that replaces a pattern ("substrate interface"), which is an interface with the substrate with respect to the segment, with the prescribed substrate interface.

Finally, a substrate netlist generation unit (108 in FIG. 1) uses the substrate interface diagram of each segment selected as described above, to generate the substrate netlist. The substrate netlist generation unit (108 in FIG. 1) corresponds to a unit that generates the substrate netlist, based on the substrate interface diagram of a plurality of segments.

According to the semiconductor device design support apparatus of the present invention as above, it is possible to execute high accuracy noise analysis in a short time, by the macro-model of segment units and the substrate netlist whose number of nodes is reduced.

First Exemplary Embodiment

Figure 2:
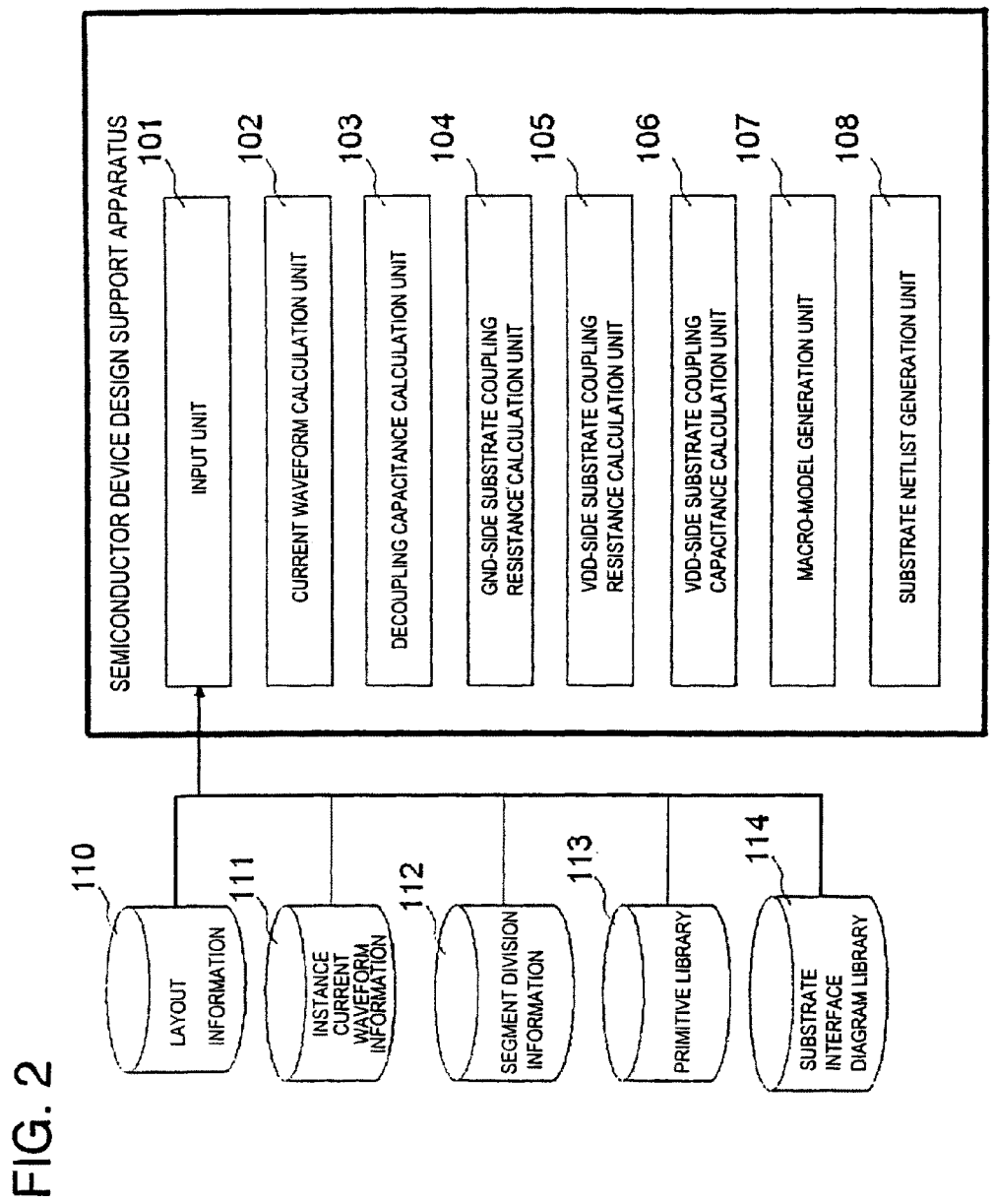
FIG. 2 is a drawing showing a configuration of a semiconductor device design support apparatus of a first exemplary embodiment of the present invention.

Next, a detailed description is given concerning a first exemplary embodiment of the present invention, making reference to the drawings. FIG. 2 is a drawing showing a configuration of a semiconductor device design support apparatus of the first exemplary embodiment of the present invention.

Referring to FIG. 2, the semiconductor device design support apparatus is shown, being provided with layout information 110, instance current waveform information 111, segment division information 112, a primitive library 113, an input unit 101 which receives as input, data from a substrate interface diagram library 114, a current waveform calculation unit 102, a decoupling capacitance calculation unit 103, a GND-side substrate coupling resistance calculation unit 104, a VDD-side substrate coupling resistance calculation unit 105, a VDD-side substrate coupling capacitance calculation unit 106, a macro-model generation unit 107, and a substrate netlist generation unit 108.

Moreover, the semiconductor device design support apparatus exemplified in FIG. 1 and FIG. 2 can be realized by a computer provided with a CPU, a storage device, an output device, and the like. The respective abovementioned units of the semiconductor device design support apparatus can be realized by reading a program that executes the following operations, from the storage device of the computer, and executing the program in the CPU.

Figure 3:
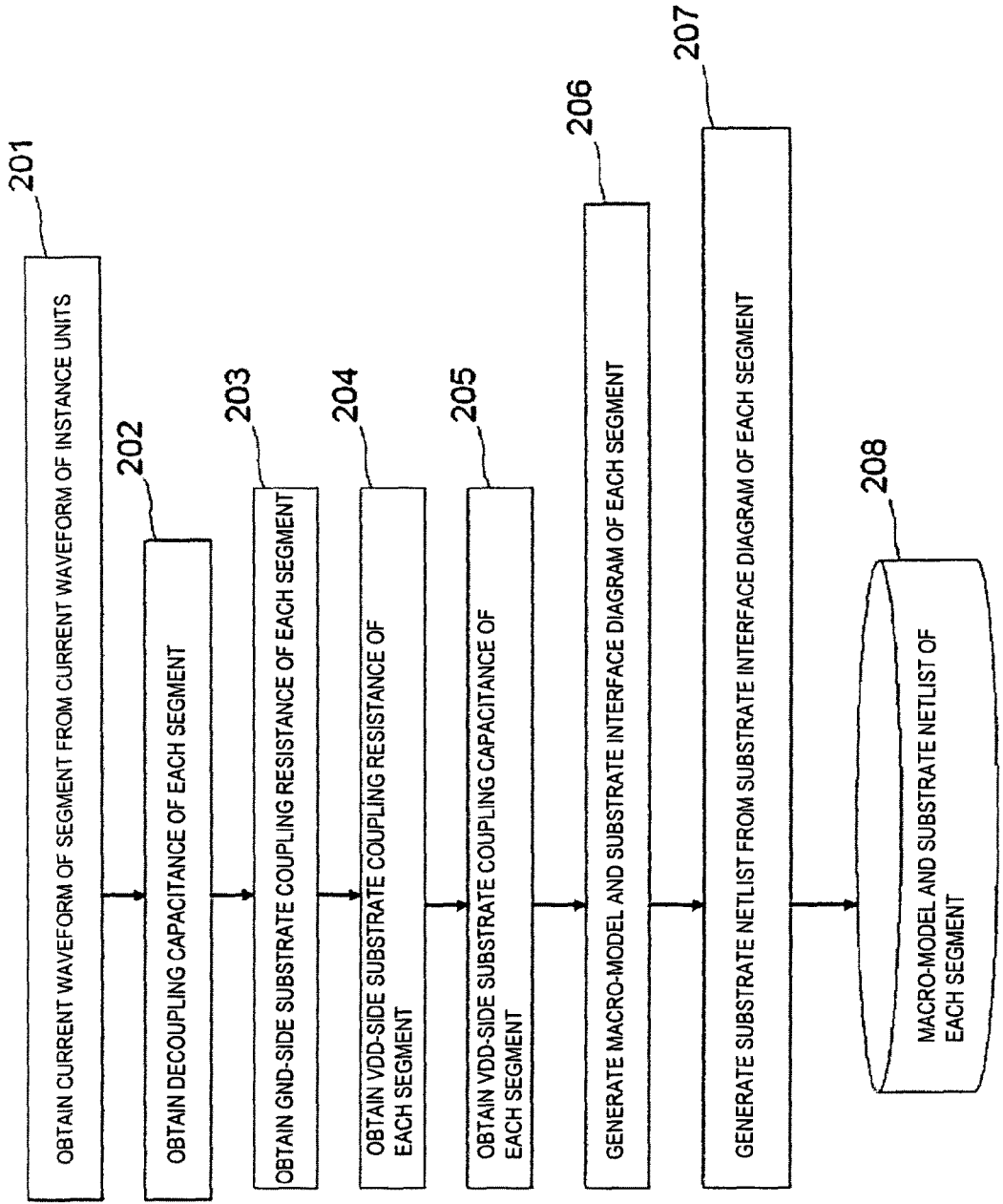
FIG. 3 is a drawing showing operation flow of the semiconductor device design support apparatus of the first exemplary embodiment of the present invention.

FIG. 3 is a drawing showing operation flow of the abovementioned semiconductor device design support apparatus. Referring to FIG. 3, first, the current waveform calculation unit 102 obtains a current waveform in segment units from the instance current waveform information 111 and the segment division information 112 (step 201). The instance current waveform information 111 can, for example, be obtained from the primitive library 113 and switching information (omitted from the drawings), by using a method described in Non-Patent Document 1.

Figure 4:
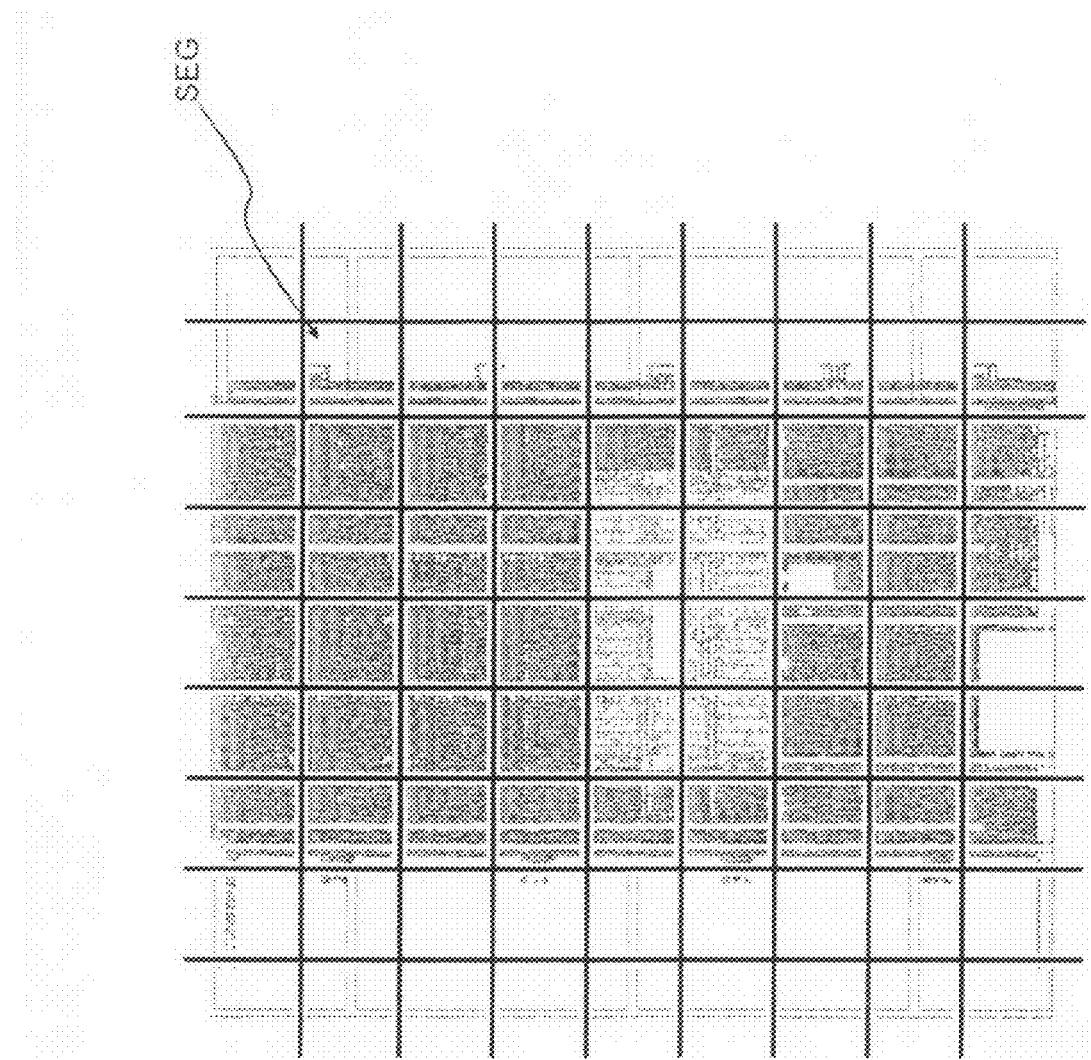
FIG. 4 is a drawing for describing segment division.

The segment division information, as shown in FIG. 4, is information for dividing the semiconductor device layout into several segments (SEG in FIG. 4), and instances included in each segment can be specified. The current waveform calculation unit 102 obtains a current waveform in segment units using the segment division information 112 and current waveforms in the abovementioned instance units. Moreover, in the example of FIG. 4, equal divisions are made into segments of a constant size, but with variations of current values of the semiconductor device, division may be made into segments of different sizes.

Next, the decoupling capacitance calculation unit 103 obtains decoupling capacitance of each segment from the layout information 110, the segment division information 112, and the primitive library 113 (step 202).

Next, the GND-side substrate coupling resistance calculation unit 104 obtains the substrate coupling resistance on a GND side of each segment, from the layout information 110, the segment division information 112, and the primitive library 113, as a substrate coupling resistance on a first potential side of each segment (step 203).

Next, the VDD-side substrate coupling resistance calculation unit 105 obtains the substrate coupling resistance on a VDD side of each segment, from the layout information 110, the segment division information 112, and the primitive library 113, as substrate coupling resistance on a second potential side of each segment (step 204).

Next, the VDD-side substrate coupling capacitance calculation unit 106 obtains the substrate coupling capacitance on a VDD side of each segment, from the layout information 110, the segment division information 112, and the primitive library 113, as substrate coupling capacitance on the second potential side of each segment (step 205).

Next, the macro-model generation unit 107 generates the substrate interface diagram and the macro-model of each segment, from the current waveform in segment units, the decoupling capacitance, the GND-side substrate coupling resistance, the VDD-side substrate coupling resistance, and the VDD-side substrate coupling capacitance, obtained in the abovementioned steps 201 to 205, and the layout information 110, the segment division information 112, and the primitive library 113 (step 206).

Figure 5:
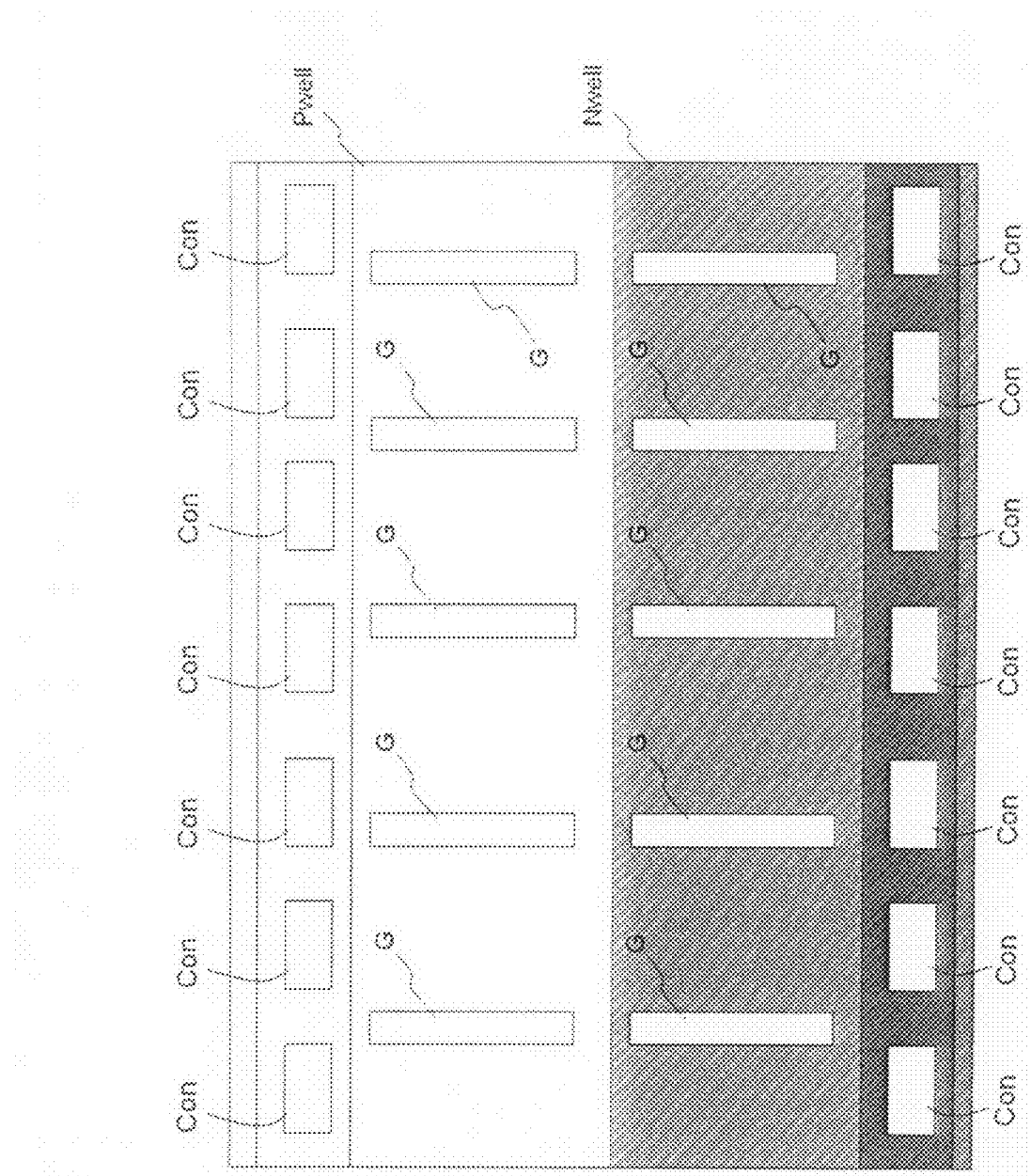
FIG. 5 is an example of a substrate interface before replacement by a substrate interface diagram.

Here, a description is given concerning a method of generating the abovementioned substrate interface diagrams. FIG. 5 is a drawing for describing the substrate and the interface, with an inverter as an example.

In a case of FIG. 5, a transistor gate part G and a substrate contact part Con form interfaces (substrate interfaces) with the substrate. In the example of FIG. 5, there exist 24 substrate interfaces.

Figure 6:
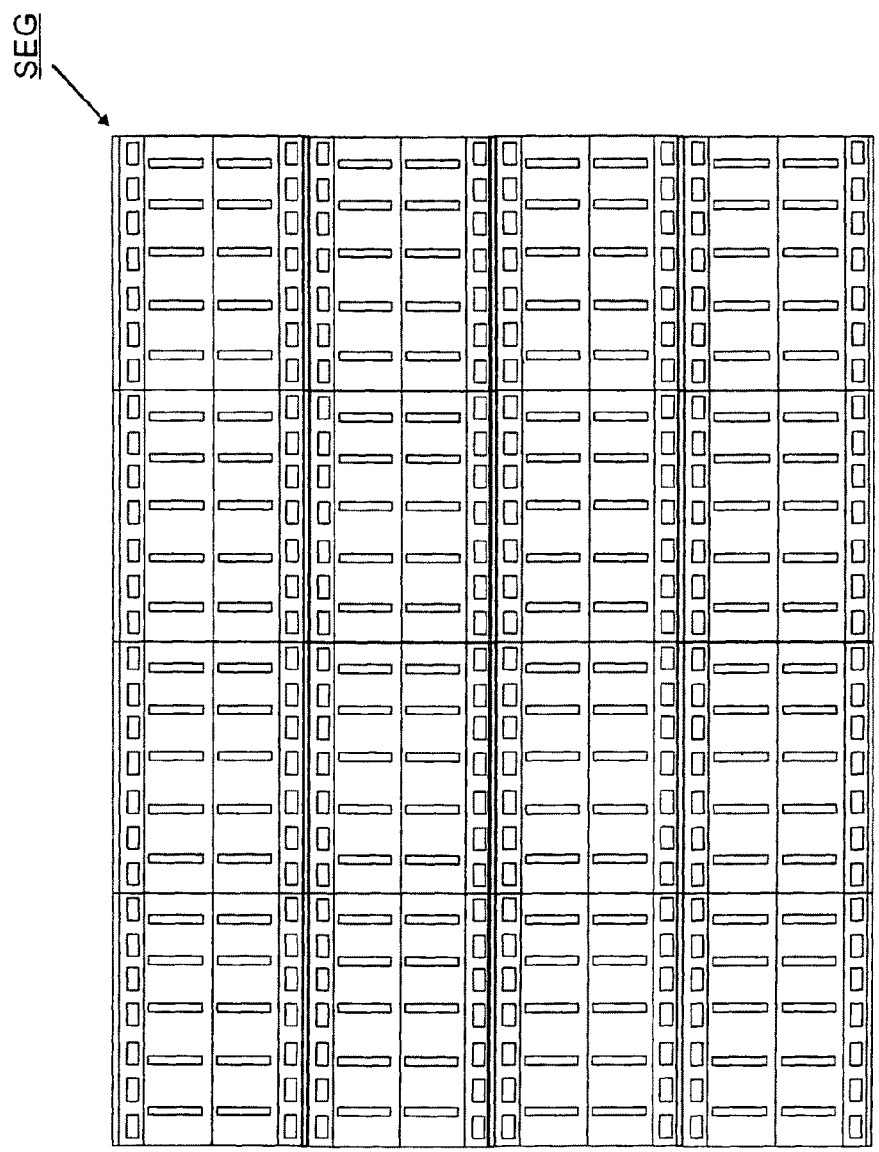
FIG. 6 is an example of a substrate interface before replacement by a substrate interface diagram.

If division into even larger segments is done as shown in FIG. 6, the number of substrate interfaces becomes very large. For example, in the segments of FIG. 6, there exist 24×16=384 substrate interfaces.

Consequently, consideration is given to reducing this plurality of existing substrate interfaces, and to shortening processing time for noise analysis.

First, the transistor gates G of FIG. 5 can be excluded from the substrate interfaces, since the injected amount of current to the substrate is small.

The contacts Con in a high density diffusion region (Pdiff/Ndiff) on a remaining Pwell (Nwell) side are to be replaced by the substrate interface diagram (Interface). As described below, when the number of contacts existing within a segment exceeds a fixed number, the substrate resistance is determined, so that, for example, based on the size of the segment, or the number of instances existing inside the segment, it is possible to select the substrate interface diagram from the substrate interface diagram library 114.

FIG. 7 is an example in which replacement by the substrate interface diagram is performed, with an area equal to that in FIG. 5 as one segment. In this example, it is understood that 24×16=384 substrate interfaces are degenerated to 16 substrate interface diagrams.

Next, the substrate netlist generation unit 108 generates the substrate netlist using the substrate interface diagram of each segment (step 207).

As described above, according to the present mode, a macro-model is generated with segment units, and by performing replacement by the substrate interface, it is possible to reduce time taken for the substrate netlist, and furthermore, to reduce the size of the substrate netlist.

First Example

Continuing, a more specific description is given with the abovementioned first exemplary embodiment of the present invention as a first example. In the present example, consideration is given to substrate noise analysis of a semiconductor device that is a multiple power supply circuit, in an SOC device. Furthermore, the description is given with a first conductivity type being a P-type and a second conductivity type being an N-type.

Once again, referring to FIGS. 2 and 3, a description is given of operation of the semiconductor device design support apparatus of the present example for each step in turn.

First, by inputting the instance current waveform information 111, the segment division information 112, the primitive library 113, and the substrate interface diagram library 114 to the input unit 101, a sequence of processing of FIG. 3 is started.

In step 201, the current waveform calculation unit 102 obtains the current waveform in each segment unit based on the instance current waveform information 111, and the segment division information 112.

When a macro-model of FIG. 8 is used, the current waveform in segment units obtained here is contained in Icurrent 1001 of FIG. 8.

Figure 9:
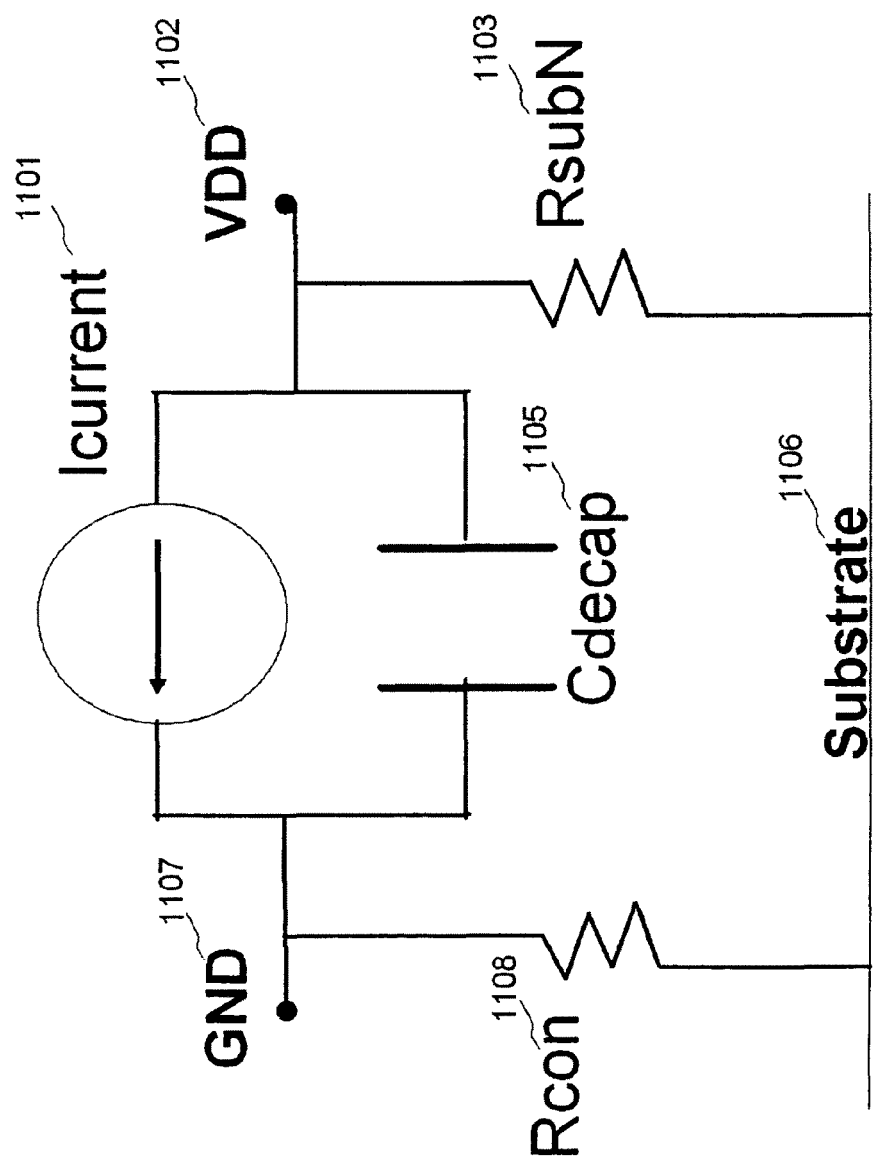
FIG. 9 is a drawing showing another example of a segment macro-model.

Furthermore, when a macro-model of FIG. 9 is used, the current waveform in segment units obtained here is contained in Icurrent 1101 of FIG. 9.

In step 202, the decoupling capacity calculation unit 103, which obtains the decoupling capacity of each segment, obtains the decoupling capacity inside each segment.

When the macro-model of FIG. 8 used, the decoupling capacity inside each segment obtained here is contained in Cdecap 1005 of FIG. 8.

Furthermore, when a macro-model of FIG. 9 is used, the decoupling capacity inside each segment obtained here is contained in Cdecap 1105 of FIG. 9.

In step 203, the GND-side substrate coupling resistance calculation unit 104 obtains the GND-side substrate coupling resistance of each segment.

When the macro-model of FIG. 8 is used, the GND-side substrate coupling resistance of each segment obtained here is contained in Rcon 1008 of FIG. 8.

When the macro-model of FIG. 9 is used, the GND-side substrate coupling resistance of each segment obtained here is contained in Rcon 1108 of FIG. 9.

The GND-side substrate coupling resistance (Rcon), in the case the example of FIG. 5, is a resistance that is equivalent to a Pwell side substrate contact Con of the upper margin of FIG. 5.

In general in a case of an ASIC type chip, in a digital part, a plurality of contacts are disposed in a macro upper portion. This is because a potential is given to a back bias of a gate. If all these contact resistances are modeled, the number of nodes increases and the substrate netlist scale increases.

Figure 10:
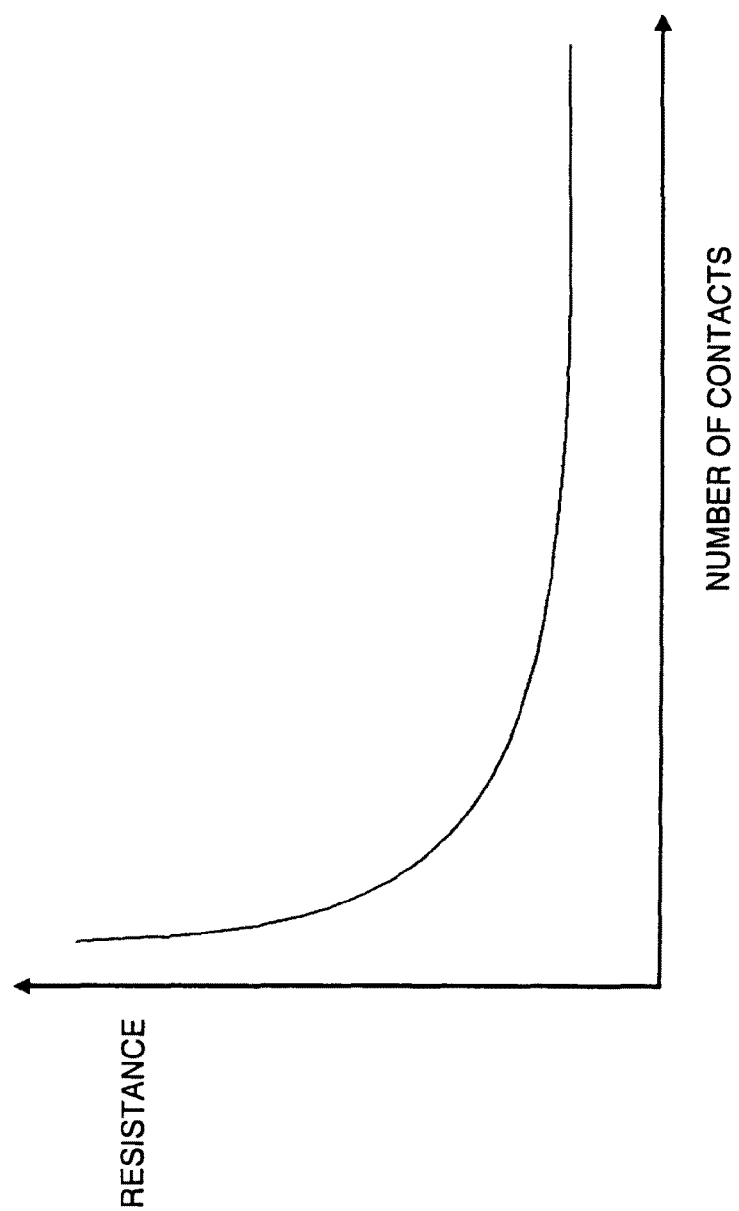
FIG. 10 is a drawing showing one example illustrating a relationship of number of contacts and substrate resistance.
Figure 11:
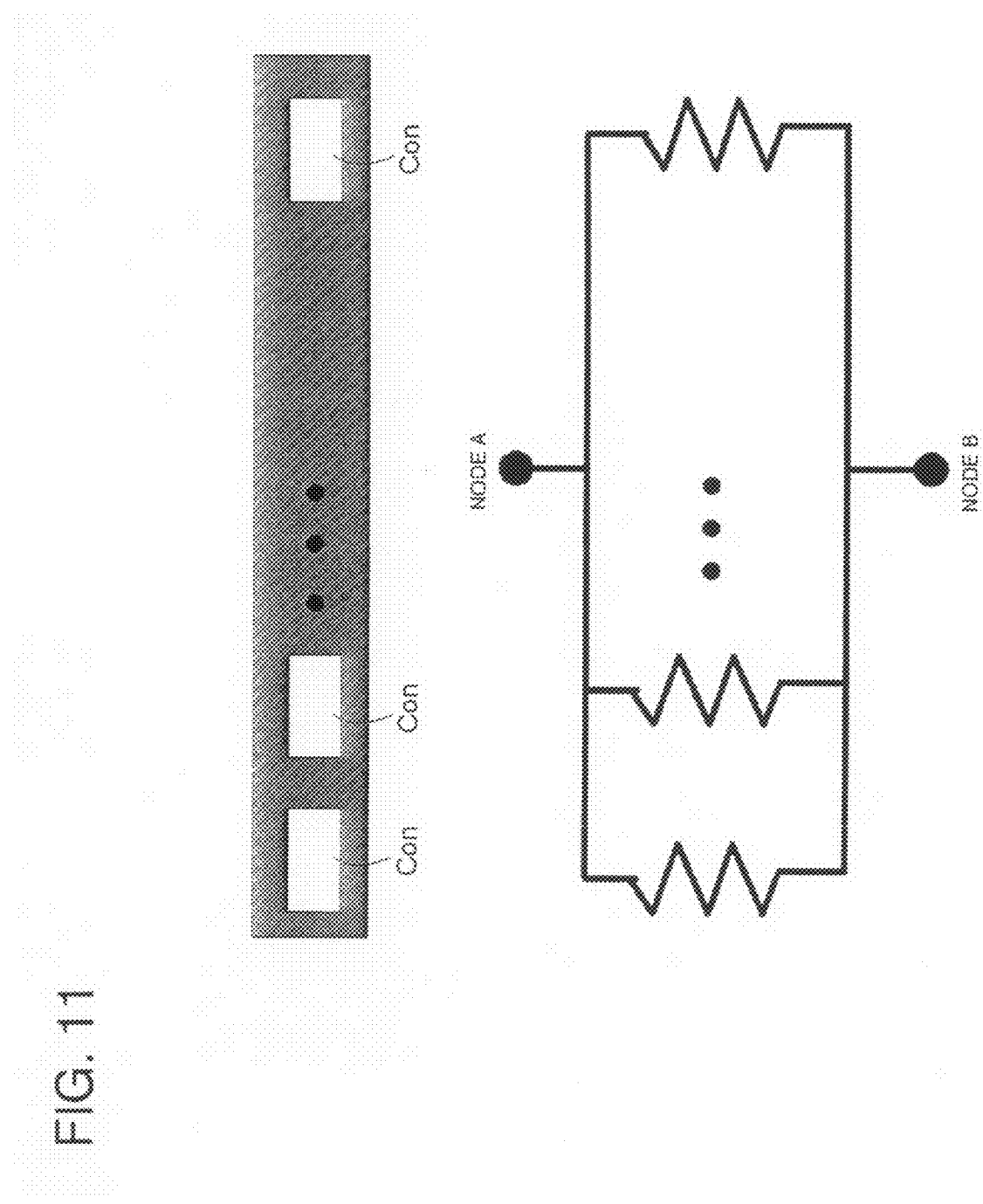
FIG. 11 is a drawing showing one example of a diagram representing a substrate interface and a substrate resistance in circuit form.

Consequently, degeneration of these contacts is performed. FIG. 10 shows change of resistance value according to number of contacts. Furthermore, FIG. 11 shows an outline drawing of resistance degeneration. As may be understood from FIG. 10 and FIG. 11, the resistance value changes according to the number of contacts, and if there is a certain number of contacts, the resistance value is regarded as having a constant value and there is no problem. In an ASIC digital circuit as described above, since a large number of contacts are disposed, it is understood that the resistance may be regarded as being constant. This value is Rcon.

In step 204, the VDD-side substrate coupling resistance calculation unit 105 obtains the VDD-side substrate coupling resistance of each segment.

When the macro-model of FIG. 8 is used, the VDD-side substrate coupling resistance of each segment obtained here is contained in RsubN 1003 of FIG. 8.

When the macro-model of FIG. 9 is used, the VDD-side substrate coupling resistance of each segment obtained here is contained in RsubN 1103 of FIG. 9.

The abovementioned VDD-side substrate coupling resistance (RsubN) can be obtained with the same type of consideration as for the GND-side substrate coupling resistance (Rcon).

In step 205, the VDD-side substrate coupling capacitance calculation unit 106 obtains the VDD-side substrate coupling capacitance of each segment.

When the macro-model of FIG. 8 is used, the VDD-side substrate coupling capacitance of each segment obtained here is contained in Cwell 1004 of FIG. 8.

When the macro-model of FIG. 9 is used, the VDD-side substrate coupling capacitance of each segment obtained here is referred to when Nwell is degenerated to the substrate interface diagram.

In step 206, the macro-model generation unit 107 generates the macro-model of each segment having the abovementioned respective values, and the substrate interface diagram.

Figure 12:
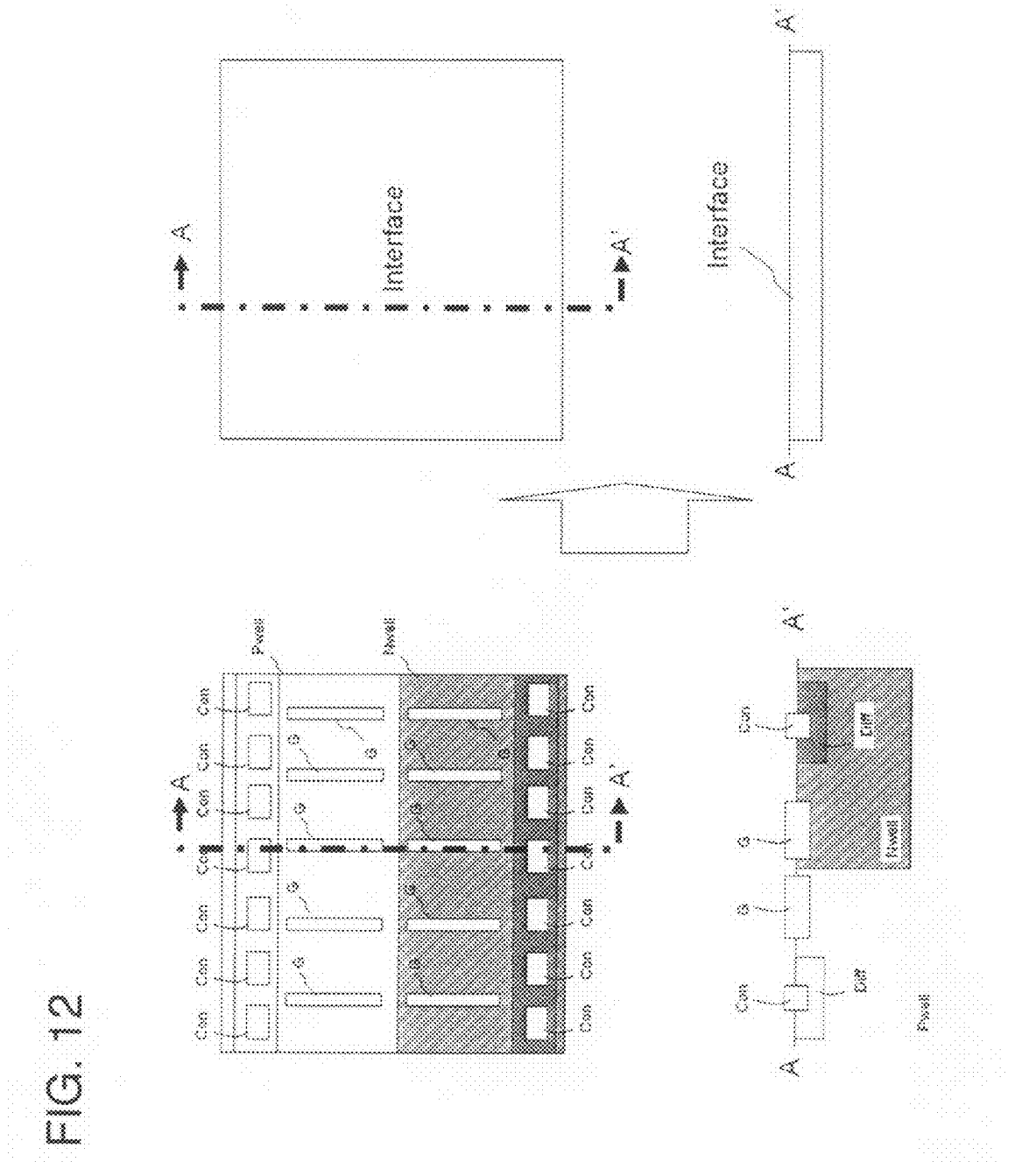
FIG. 12 is a drawing showing one example of replacement of the substrate interface by the substrate interface diagram.
Figure 13:
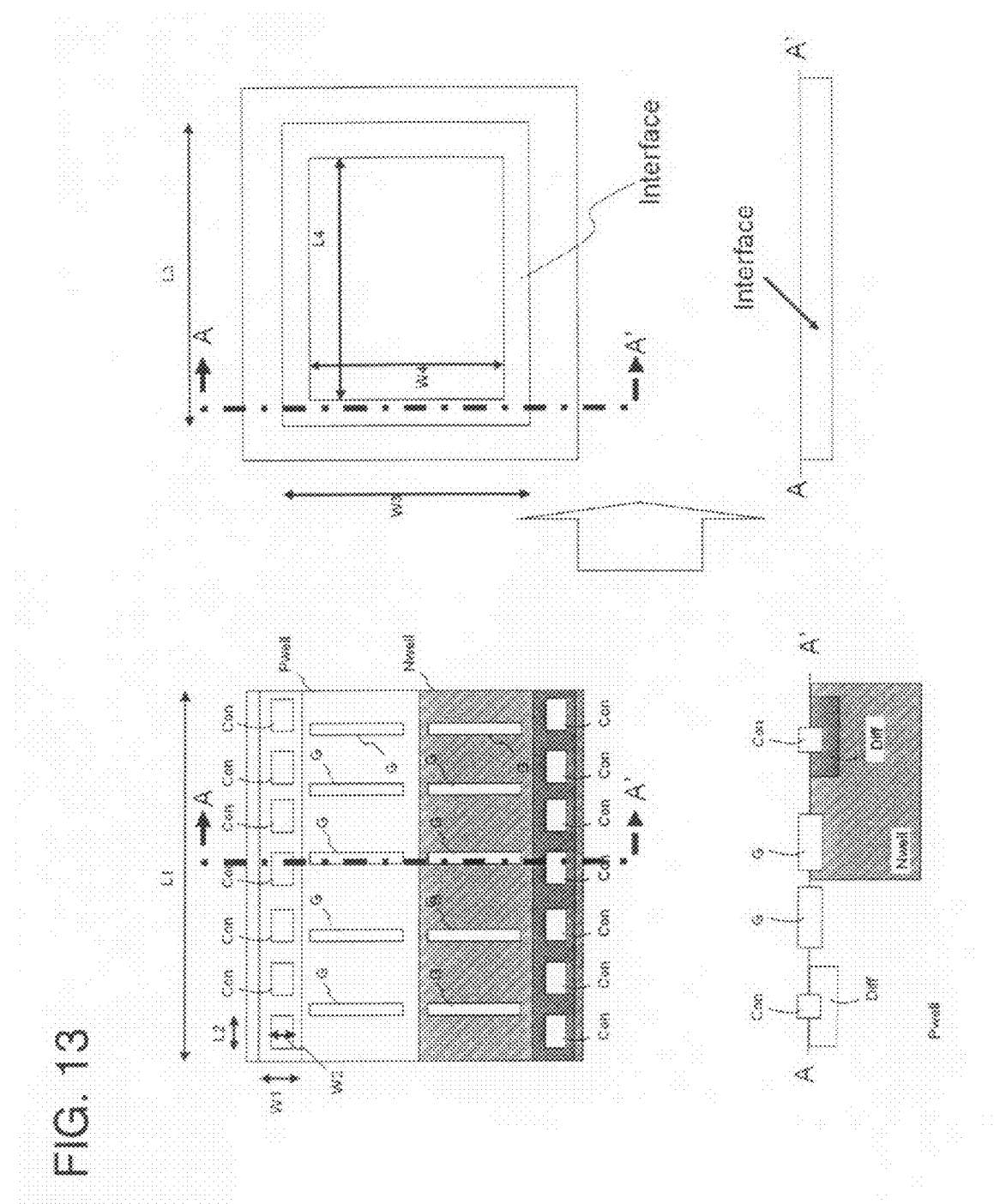
FIG. 13 is a drawing showing another example of replacement of a substrate interface by a substrate interface diagram.
Figure 14:
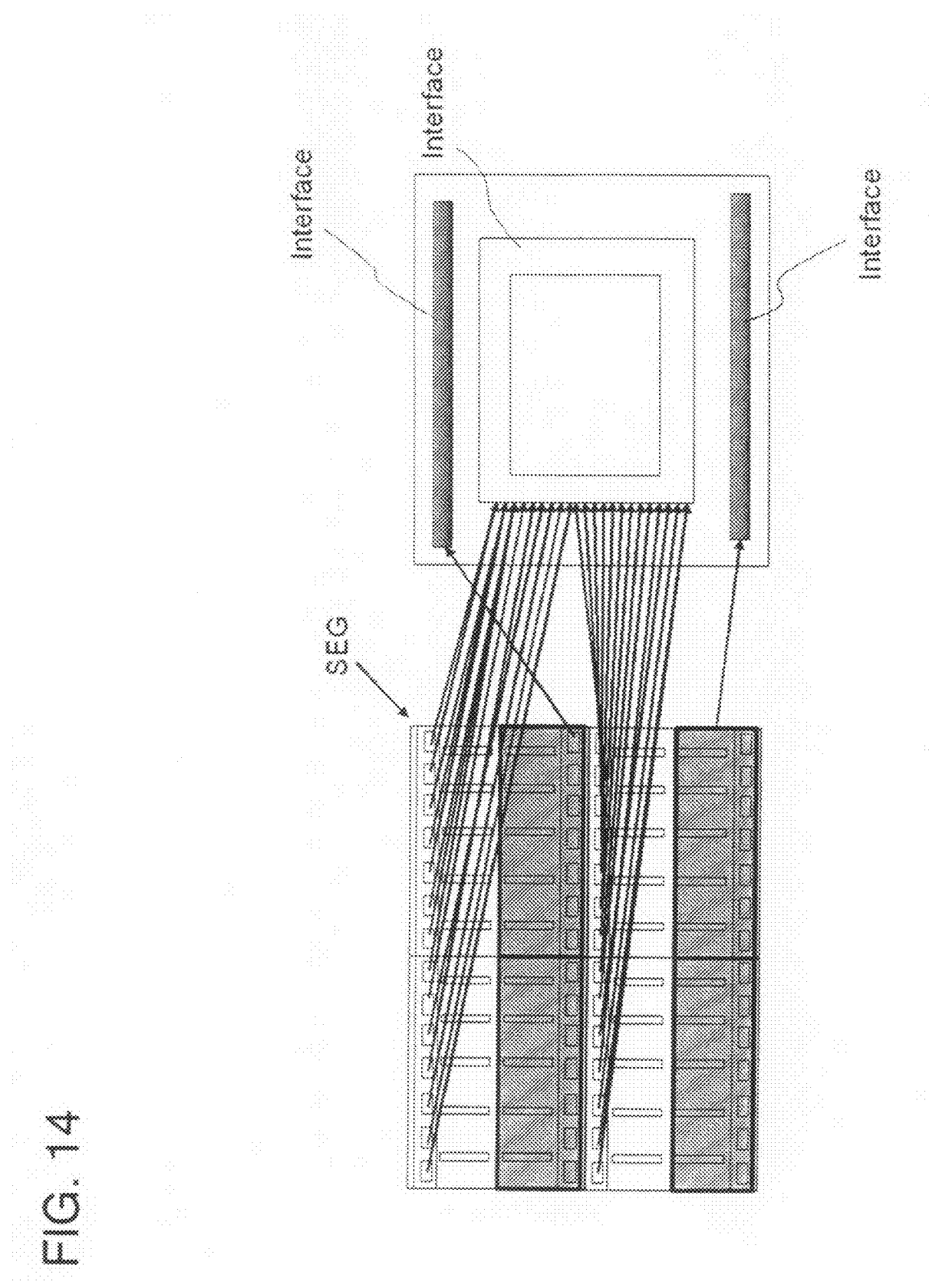
FIG. 14 is a drawing showing another example of replacement of a substrate interface by a substrate interface diagram.

Here, a description is given concerning a method of generating the substrate interface diagram by the macro-model generation unit 107, making reference to FIG. 12 to FIG. 14. FIG. 12 is an example in which a substrate interface diagram according to segment size is selected from the substrate interface diagram library 114, and a corresponding doping profile (refer to FIG. 15) is set.

Here, a description is given concerning the generation method of the substrate interface diagram library 114 when the present method is used.

Figure 16:
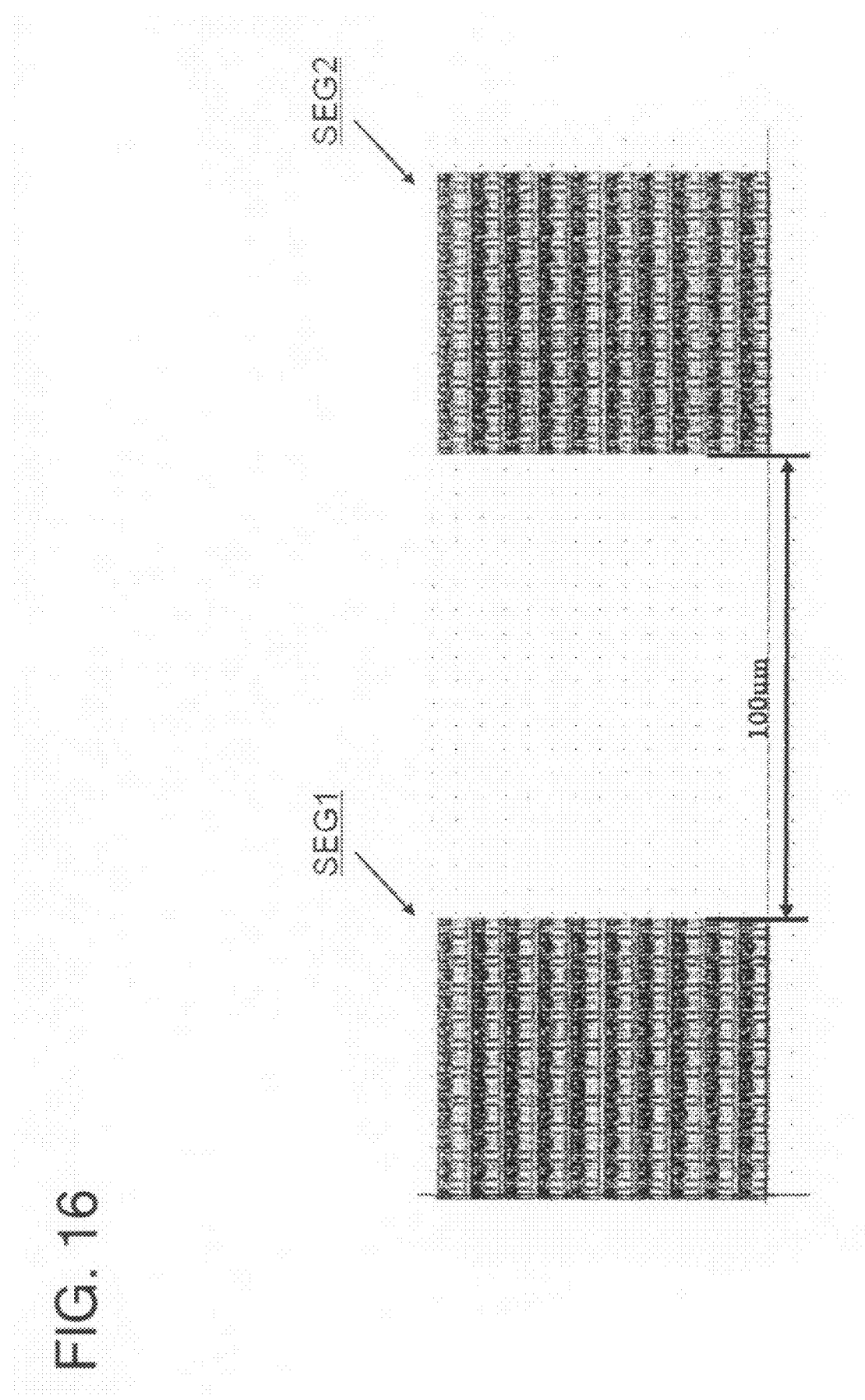
FIG. 16 is a drawing showing one example of a test pattern when a substrate interface diagram library is generated.

First, as shown in FIG. 16, 2 segments SEG1 and SEG2 are provided, and disposed at a prescribed interval (100 μm in FIG. 16, for example), and a resistance value with no degeneration is examined.

Next, a diagram (substrate interface diagram), in which a pattern that forms an interface with the substrate is degenerated, is provided, and the substrate resistance thereof changes the doping profile shown in FIG. 15, so as to be equal to the resistance value with no degeneration.

Measurement of the abovementioned resistance value with no degeneration and adjustment of the doping profile are performed, with regard to several segment sizes, and the substrate interface diagram library 114 is generated.

As described above, by providing the substrate interface diagram according to the segment size, and the doping profile, as shown in the right-side drawing of FIG. 12, by selecting the substrate interface diagram (interface) registered in the library based on the segment size, it is possible to replace 24 substrate interfaces by 1 substrate interface diagram. At this time, since a doping profile that was set in advance is selected, accuracy of the substrate netlist is assured.

FIG. 13 is an example in which the substrate interface diagram is generated by a method other than that of FIG. 12 described above.

Figure 17:
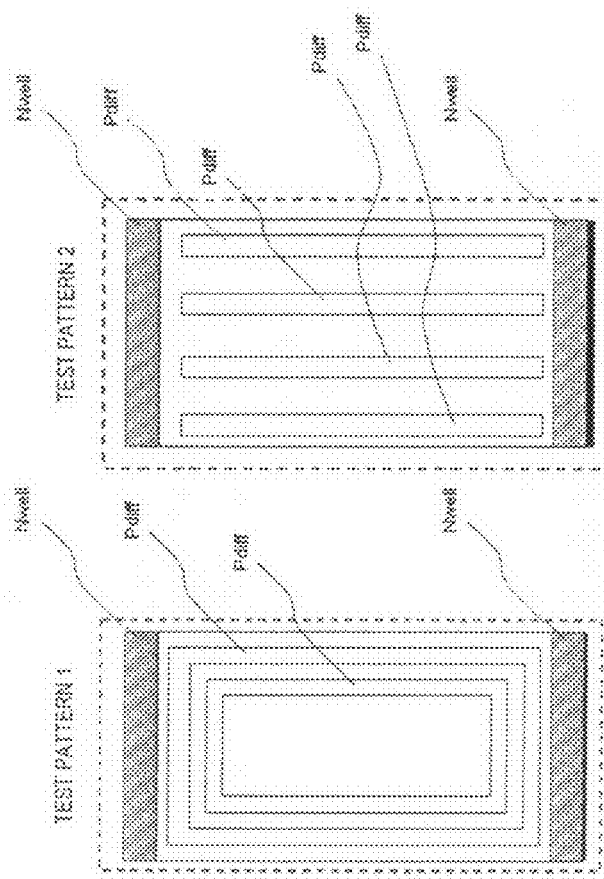
FIG. 17 is a drawing for describing a principle of a method of generating a substrate interface diagrams with equivalent substrate resistance.

The present inventors discovered that if the substrate interface diagram (interface) having a perimeter length equal to that of a high density diffusion region (Pdiff/Ndiff) in Pwell (Nwell) in FIG. 5 is used, the substrate resistance value is the same. FIG. 17 shows a result of investigating the substrate resistance values of test patterns having a certain perimeter length. In the example of FIG. 17, 2 test patterns (box shape and stripe shape), having perimeter lengths almost the same as that of the (non-degenerated) substrate interface before degeneration, are generated, and the substrate resistances of each thereof are measured. As is evident from looking at the table in the upper section of FIG. 17, irrespective of differences of the number of transistors or test patterns, if the perimeter lengths are about the same, a result was obtained in which the substrate resistance values are about the same.

Based on the abovementioned finding, if the total of the perimeter lengths of the substrate interfaces to be degenerated is obtained, replacement by a substrate interface diagram having an equal perimeter length is possible. For example, the perimeter length of Pdiff in FIG. 13 is obtained by $((L1+W1)\times2+(L2+W2)\times14)$. In this case, it is possible to make a replacement to a substrate interface diagram having a perimeter length of $((L1+W1)\times2+(L2+W2)\times14)=((L3+W3)\times2+(L4+W4)\times2)$, and the substrate resistance value at this time is approximately the same. Generation is preferably performed such that the number of substrate interface diagrams and the number of diagram vertexes are as few as possible. This is because the number of substrate interface diagrams and the number of vertexes affect processing time and netlist size, when the substrate netlist generation is performed.

As described above, by having the perimeter length of the substrate interface diagram the same as the perimeter length of the diagram before replacement, as shown in the right-side drawing of FIG. 13, by selecting a substrate interface diagram (interface) registered in the library based on the perimeter length, it is possible to replace the 24 substrate interfaces by 1 substrate interface diagram. At this time, as described using FIG. 17, since the substrate resistance values do not change before and after replacement, accuracy of the substrate netlist is assured.

FIG. 14 is an example in which generation of the macro-model and generation of the substrate interface diagram are performed, with a segment larger than the examples of FIG. 12 and FIG. 13, and, in addition, a substrate interface diagram for Nwell is generated.

The substrate interface diagram equivalent to Nwell can be generated by the following procedure. First, an area for which a macro is to be generated is extracted from an input diagram. Next, an Nwell area inside the area in question is extracted (thick line in FIG. 14), the length of a side face and the area of a bottom face are obtained, that is, a total capacity value is obtained from the volume of Nwell. Next, a substrate interface diagram with the same capacity value is selected and generated, from the substrate interface diagram library 114.

In the abovementioned example, a description was given of selecting the substrate interface diagram with the same capacity value from the substrate interface diagram library 114, but as in the replacement of the substrate interface diagram described in FIG. 12, plural combinations of doping profiles and substrate interface diagrams having several capacities may be provided, and a combination having the same capacity may be selected.

As described above, in the example of FIG. 14, $24\times4=96$ substrate interfaces are replaced by 1 substrate interface diagram, and additionally degeneration of 4 Nwell areas is realized. Clearly, as described using FIG. 12 and FIG. 13, since a substrate interface diagram having an appropriate doping profile or perimeter length is selected, accuracy of the substrate netlist is assured.

In step 207, the substrate netlist is generated from the substrate interface diagrams of each segment, generated as described above.

The macro-model and substrate netlist of each segment, which have been generated, are connected to netlists of GND and VDD, and package and PWB (Printed Wiring Board) netlists, to form noise analysis netlists and to be used in analysis. For example, it is possible to perform a TRAN analysis using a chip analysis netlist, and to obtain a waveform attaining a macro having a noise constraint. This waveform is used in a judgment as to whether or not the noise constraint is satisfied.

A description has been given above concerning preferred exemplary embodiments and examples of the present invention, but the invention is not limited to the abovementioned exemplary embodiments and examples, and it is possible to add further modifications, substitutions, and adjustments to the invention within a range that does not depart from the fundamental technological concept of the invention. For example, in the abovementioned example, a description was given in which a P-type substrate is used, with the first conductivity type being a P-type and with the second conductivity type being an N-type, but when focusing on a semiconductor device using a N-type substrate, the first conductivity type is an N-type and the second conductivity type is a P-type.

The present invention is applicable as technology for analyzing effects of substrate noise occurring in a silicon substrate of semiconductor device.

In the present invention, the following modes are possible.

Mode 1: As set forth as the first aspect.

Mode 2: The semiconductor device design support apparatus according to mode 1, comprises, as a unit that generates the macro-model: an input unit that receives as input at least layout information of a semiconductor device, a current waveform of an instance, primitive library information, and segment division information; a current waveform calculation unit that refers to data inputted to the input unit and obtains a current waveform of each segment; a decoupling capacitance calculation unit that refers to data inputted to the input unit and obtains decoupling capacitance of each segment; a first substrate coupling resistance calculation unit that refers to data inputted to the input unit and obtains a substrate coupling resistance of a first potential side of each segment; and a second substrate coupling resistance calculation unit that refers to data inputted to the input unit and obtains a substrate coupling resistance of a second potential side, different from the first potential side, of each segment; wherein a macro-model that holds calculated values calculated by each of the calculation unit is generated.

Mode 3: The semiconductor device design support apparatus according to mode 2, further comprises: a substrate coupling capacitance calculation unit that obtains a substrate coupling capacitance of the second potential side of each of the segments; wherein a macro-model holding a substrate coupling capacitance value of the second potential side is generated.

Mode 4: The semiconductor device design support apparatus according to any one of modes 1 to 3, further comprises a substrate interface diagram library that holds a plurality of substrate interface diagrams.

Mode 5: In the semiconductor device design support apparatus according to mode 4, the substrate interface diagram library holds a combination of substrate interface diagram and doping profile for each segment size or for each number of instances included in the segments; and wherein a combination of the substrate interface diagram and doping profile, based on the segment size or the number of instances included in the segment, is selected.

Mode 6: In the semiconductor device design support apparatus according to any one of modes 1 to 4, a total perimeter length of a first conductivity type diffusion regions of a first conductivity type well side is obtained, and a substrate interface of the first conductivity type well side is replaced by a substrate interface diagram having a perimeter length equivalent to the total perimeter length.

Mode 7: In the semiconductor device design support apparatus according to any one of modes 1 to 4, a total perimeter length of a second conductivity type diffusion regions of a second conductivity type well side is obtained, and a substrate interface of the second conductivity type well side is replaced by a substrate interface diagram having a perimeter length equivalent to the total perimeter length.

Mode 8: In the semiconductor device design support apparatus according to any one of modes 1 to 7, a capacitance value of the second conductivity type well side is calculated from volume of the second conductivity type well, and the second conductivity type well is replaced by a diagram having a capacitance equivalent to the capacitance value.

Mode 9: As set forth as the second aspect.

What is claimed is:

1. A semiconductor device design support apparatus comprising:
   a first unit that divides a semiconductor device layout into a plurality of segments and generates a macro-model of said plurality of segments by using a current waveform of an instance included in said plurality of segments;
   a second unit that replaces a substrate interface pattern, with a substrate interface diagram so that a substrate resistance of the substrate interface diagram is substantially equal to a substrate resistance of said substrate interface pattern; and
   a third unit that generates a substrate netlist, based on said substrate interface diagram of said plurality of segments, wherein the first unit comprises:
      an input unit that receives as an input at least a layout information of a semiconductor device, the current waveform of the instance, a primitive library information, and a segment division information;
      a current waveform calculation unit that refers to the data input to said input unit and obtains the current waveform of each segment;
      a decoupling capacitance calculation unit that refers to the data input to said input unit and obtains a decoupling capacitance of each segment;
      a first substrate coupling resistance calculation unit that refers to the data input to said input unit and obtains a substrate coupling resistance of a first potential side of each segment; and
      a second substrate coupling resistance calculation unit that refers to the data input to said aid input unit and obtains a substrate coupling resistance of a second potential side different from said first potential side, of each segment, and
   wherein a macro-model that holds calculated values calculated by each of said calculation units is generated.

2. The semiconductor device design support apparatus according to claim 1, further comprising:
   a substrate coupling capacitance calculation unit that obtains a substrate coupling capacitance of said second potential side of each of said plurality of segments,
   wherein a macro-model holding a substrate coupling capacitance value of said second potential side is generated.

3. The semiconductor device design support apparatus according to claim 2, further comprising a substrate interface diagram library that bolds a plurality of substrate interface diagrams.

4. The semiconductor device design support apparatus according to claim 3, wherein said substrate interface diagram library holds a combination of the substrate interface diagram and a doping profile for each segment size or for each number of instances of segments included in said each segment of said plurality of segments, and wherein a combination of said substrate interface diagram and the doping profile, based on the segment size or the number of instances included, in said segment, is selected.

5. The semiconductor device design support apparatus according to claim 2, wherein a total perimeter length of a first conductivity type diffusion regions of a first conductivity type well side is obtained, and a substrate interface of said first conductivity type well side is replaced by a substrate interface diagram having a perimeter length equivalent to said total perimeter length.

6. The semiconductor device design support apparatus according to claim 2, wherein a total perimeter length of a second conductivity type diffusion regions of a second conductivity type well side is obtained, and a substrate interface of said second conductivity type well side is replaced by a substrate interface diagram having a perimeter length equivalent to said total perimeter length.

7. The semiconductor device design support apparatus according to claim 1, further comprising a substrate interface diagram library that holds a plurality of substrate interface diagrams.

8. The semiconductor device design support apparatus according to claim 7, wherein said substrate interface diagram library holds a combination of the substrate interface diagram and a doping profile for each segment size or for each number of instances of segments included in said each segment of said plurality of segments, and wherein a combination of said substrate interface diagram and the doping profile, based on the segment size or the number of instances included in said segment, is selected.

9. The semiconductor device design support apparatus according to claim 7, wherein a total perimeter length of a first conductivity type diffusion regions of a first conductivity type well side is obtained, and a substrate interface of said first conductivity type well side is replaced by a substrate interface diagram having a perimeter length equivalent to said total perimeter length.

10. The semiconductor device design support apparatus according to claim 7, wherein a total perimeter length of a second conductivity type diffusion regions of a second conductivity type well side is obtained, and a substrate interface of said second conductivity type well side is replaced by a substrate interface diagram having a perimeter length equivalent to said total perimeter length.

11. The semiconductor device design support apparatus according to claim 1, wherein a total perimeter length of a first conductivity type diffusion regions of a first conductivity type well side is obtained, and a substrate interface of said first conductivity, type well side is replaced by a substrate interface diagram having a perimeter length equivalent to said total perimeter length.

12. The semiconductor device design support apparatus according to claim 1, wherein a total perimeter length of a second conductivity type diffusion regions of a second conductivity type well side is obtained, and a substrate interface of said second conductivity type well side is replaced by a substrate interface diagram having a perimeter length equivalent to said total perimeter length.

13. The semiconductor device design support apparatus according to claim 1, wherein a capacitance value of said second conductivity type well side is calculated from a volume of said second conductivity type well, and said second conductivity type well is replaced by a diagram having a capacitance equivalent to said capacitance value.

* * * * *